United States Patent [19]

Bernstein et al.

[11] 4,358,396
[45] Nov. 9, 1982

[54] PARTICULATE CATALYST AND PREPARATION

[75] Inventors: Philip Bernstein, Glen Ridge, N.J.; James P. Coffey; Alan E. Varker, both of Warwick, N.Y.; John T. Arms, Monroe, N.Y.; William D. K. Clark, Warwick, N.Y.; Paul D. Goodell, Ridgewood, N.J.

[73] Assignee: MPD Technology Corporation, Wyckoff, N.J.

[21] Appl. No.: 226,456

[22] Filed: Jan. 19, 1981

[51] Int. Cl.³ .............................................. B01J 31/02
[52] U.S. Cl. ..................................... 252/430; 252/428
[58] Field of Search .................. 252/428, 430; 429/42

[56] References Cited

U.S. PATENT DOCUMENTS

| | | | |
|---|---|---|---|
| 3,121,029 | 2/1964 | Duddy | 429/42 |
| 3,346,421 | 10/1967 | Thompson et al. | 252/428 |
| 3,375,208 | 3/1968 | Duddy | 260/2.1 |
| 3,395,049 | 7/1968 | Thompson et al. | 252/428 |
| 3,838,092 | 9/1974 | Vogt et al. | 260/33.6 F |
| 3,898,099 | 8/1975 | Baker et al. | 429/42 X |
| 3,930,094 | 12/1975 | Sampson et al. | 429/42 |
| 4,224,185 | 9/1980 | Wrister | 252/430 |
| 4,235,748 | 11/1980 | Berchiell et al. | 252/430 |
| 4,259,209 | 3/1981 | Nakane et al. | 252/430 |

*Primary Examiner*—John F. Niebling
*Attorney, Agent, or Firm*—Miriam W. Leff; Raymond J. Kenny

[57] ABSTRACT

A particulate catalyst composition is provided by processing components in standard polymer processing equipment to obtain catalyst particles encradled in a porous, fiber-containing polymeric material.

21 Claims, No Drawings

PARTICULATE CATALYST AND PREPARATION

This invention relates to a particulate catalyst composition adaptable for use in a fixed or fluidized catalyst bed.

BACKGROUND OF THE INVENTION

It is desirable in many processes to use catalyst materials in particulate form in a reactor. The high surface area of particulate catalysts enhance their activity. A problem encountered with the use of catalysts in this form is that they are subject to attrition and as the particle size gets smaller, the materials are less easily retained by screens, they are more easily lost and they are more difficult to recover from the reaction medium. Also, as the particles become smaller, they are subject to column packing, which inhibits contact with the reacting material.

It is an object of the present invention to envelope particulate catalysts in a binder which gives maximized access to the catalyst, is not harmful to the reaction system, and retains the catalyst. It is another object to provide a polymeric binder which permits volume changes in the catalyst in use, should that be a characteristic of the catalyst in a particular reaction.

These and other objects are achieved by the present invention in which is provided an active catalyst material encradled in a polymeric material, the polymeric material serving to preserve the integrity of the catalyst particles which permitting maximized access to such particles.

THE INVENTION

In accordance with the present invention a particulate catalyst composition is provided in which the active catalyst component is in the form of particles encradled in fibrils, the encradled catalyst being dispersed in a porous, fiber-containing polymeric material.

In accordance with the present invention a catalyst composition is developed from finely divided catalytically active (or activatable) particles and a tripartite system comprising: (1) a fibrillatable first polymer, (2) a support-contributing second polymer and (3) a major amount of a removable pore-former, the pore-former being further characterized in that it wets or can be made to wet the surface of the catalyst particles, and said three components of the system being compatible with each other and said polymers being inert or at least not harmful in the environment in which the catalyst will be used.

The tripartite system is disclosed in co-pending U.S. application Ser. No. 226,454 filed simultaneously herewith and made a part hereof.

The particulate catalyst composition, which is comprised of fibril-encradled catalyst particles in a porous, fiber-containing polymeric material is prepared by processing catalyst material and the abovementioned components of the tripartite system under conditions to fibrillate the fibrillatable polymer, preferably under dry processing conditions, and to mix intimately the components, and subsequently to remove the pore-former, thereby developing interconnecting porosity throughout the composition. Advantageously, the pore-former is a water-soluble resin, and it is conveniently removed by dissolution in water. The resultant material can be granulated and the granules can be pelletized, if desired using known techniques.

As disclosed in the aforementioned co-pending application, the porosity can be controlled with a pore-former. Thus there is no dependence on the density of the polymer for porosity. By providing a pore-former which wets the surfaces of the active material and which can be removed, access to the active material is improved. The resultant material can be granulated to a suitable size before removal of the pore-former.

In one embodiment of the present invention, the mixture of catalytically active particles and the tripartite system is formed using a dry processing technique to convert the fibrillatable polymers to fibers. This is of particular advantage when water or moisture—or some other liquid which might be the mixing medium—is harmful to one of the components such as the catalyst particles. Another advantage of the dry-type processing is that it makes possible carrying out the preparation of the catalyst material in standard polymer processing equipment.

DETAILED DESCRIPTION OF THE INVENTION

As indicated above, the catalyst composition is composed essentially of an active (or activatable) material, a fibrillated first polymer, a support-contributing second polymer, and it is characterized in that it is porous, and the pores are interconnecting and are formed in-situ by a method which maximizes the accessibility of the active material. The composition is produced from active material and a tripartite system.

The polymeric catalyst composition is comprised, by weight, generally of at least about 50% catalyst particles, and preferably of about 75% to 95%. Typically, the catalyst composition is comprised, by weight, about 75% to about 90% catalyst, about 1% to about 5% fibrillated polymer, and the balance essentially support-contributing polymer.

The components of the tripartite system should, of course, be compatible and non-reactive with each other, and the polymers should be non-reactive in the environment in which the ultimate product will be used. It is essential that the fibrillatable polymer be capable of dispersing in the support-contributing polymer. The specific choice of support-contributing polymer will depend on the ultimate use of the catalyst composition. In general, in addition to serving the dispersing function for the fibrillatable polymer, the support-contributing polymers must be compatible with and chemically stable in the environment in which the material will be used, they must not impede the function of the apparatus for which they are used, and they must serve the structural purpose for which they are intended. It is an advantage of the present materials that they can be provided with strength and structural integrity combined with flexibility depending on the choice of polymer. The use of the support-contributing polymer in addition to the fibrillatable polymer adds another dimension of freedom to the system. By way of illustration, the following polymers can be used individually or in suitable combinations: polyolefins such as polyethylene, polypropylene, polybutylene, polyisobutylene or co-polymers thereof with each other or with ethylacrylate and/or vinyl acetate; halogenated polyhydrocarbons and co-polymers; polyamides, polysulfones, polyacetates, polycarbonates, polyesters, cellulose esters or silicones. Preferred support-contributing polymer compositions for catalyst members are the thermoplastic polymers such as polyolefins, e.g. polyethylene, polypropylene and compolymers thereof, because they are substantially saturated compounds and as such would have no interaction with the catalytically active material.

The fibrillatable polymers should, of course, be compatible with the support-contributing polymer and be capable of dispersing in it, and it should be non-reactive with the environment in which it is to be used. Fluorocarbon and propylene polymers have these suitable characteristics. To be useful for the process of the present invention, it is also important for the polymer to be fibrillatable in a dry-type process. Such polymers are known. For example, polytetrafluoroethylene (PTFE) can be fibrillated from a dry powder and it is commercially available as duPont's "Teflon" 6A and 7A. Polypropylene is available as strands, tape or film which can be used, e.g., as such or cut or chopped to appropriate size. The fibrous component is effective even when present in small amounts, e.g. about 0.5 to 5%, typically about 1-2%.

The pore-forming component of the tripartite system must be removable since, to develop the porous active composition, after fibrillation the pore-forming agent is removed leaving the active particles encradled by fibers. The pore-forming component is further characterized in that it is non-reactive with the active material and other components of the system and it wets or can be made to wet the surfaces of the active material. That is, the pore-forming agents will spread on or can be made to spread on the active material. It is preferred that the pore-former be capable of serving as a processing agent in the system, and if so, that it melts below the temperature at which the active material will react. By removable is meant that the pore-former can be removed in any way that is not harmful to the remaining components and in a way that will leave the remaining material in a porous condition. In accordance with the present invention, the pore-former serves as the incipient sites for the pores and, after removal, the pores can be interconnecting and dispersed throughout the remaining material. The pore-former may be, for example, leachable directly, convertible to leachable compositions or to gaseous products. Leachable pore-forming agents may be selected, for example, from water-soluble, base-soluble, acid-soluble or organic solvent-soluble resins. Water-soluble resins can be removed by leaching with water. It is noted in this regard that addition of water to the formulated fibrous material is not critical or disadvantageous since water added at this stage does not interfere with the advantageous freedom in processing of the dry mix. Examples of pore-formers of the water-soluble type are polyolefin oxides such as polyethylene oxide and polypropylene oxide. Examples of other leachable pore-formers can be leachable are polyethylenimine, which can be leached with dilute sulfuric acid; polyacrylic acid, which can be leached with dilute sodium hydroxide; and suitable paraffin waxes, which can be leached with halogenated solvents. Removal can also be effected by enzymatic breakdown. Generally, it is possible to use any of the known pore-forming techniques for polymers so long as it is compatible with the system.

A preferred characteristic of the pore-former of this invention is that it is a polymer. As such it is compatible with the fibrillatable polymer and can serve as a system without the need for using very large quantities of additives which must be removed from the fibrillatable polymer, e.g. by filtration, before dry processing. That is, the polymeric pore-former serves as the medium which permits the combination of other components of the system to be uniformly distributed and conveniently worked. The amount used is predetermined primarily by the amount of porosity desired and not by the processing needs of the fibrillatable polymer. And in accordance with the present invention, processing can be carried out in standard polymer processing equipment. Since, the pore-former is by definition removable, no unwanted ingredients are added to the system. A further advantage of using a polymeric pore-former is that it can be used at normal working temperatures for polytetrafluoroethylene or polypropylene, i.e. about 75°-100° C. without reaching a hazardous flash point. For example, Stoddard solvent, which is sometimes considered a medium for working polytetrafluoroethylene, is unsuitable for the present process because it has a flash point of 100° to 110° F. Vehicles also not suitable for the present process are those, such as low molecular weight paraffins, naphthenes, or aromatics such as naphthalene, benzene, or industrial solvents which are mixtures of various organic compounds, e.g. Shell-Sol B or mineral spirits, which may volatilize during working on the processing equipment. A critical problem with vehicles which volatilize during processing in that the pore-former is removed before it can serve as the incipient sites for the pores.

As indicated above, the pore-forming agents, apart from being removable, are further characterized in that they are non-reactive with the active material and polymeric material, and they wet or can be made to wet the active material. It is believed that if the pore-former coats (in other words, wets or spreads on) the surfaces of the active material, i.e. before removal, this will contribute to the accessibility of the active materials when the pore-former is removed. A surfactant may be added to improve the wettability of the pore-former. Generally, it is desirable to use low temperatures, and particularly to avoid sintering temperatures in preparing or otherwise treating catalyst materials.

Pore-formers such as certain polyolefin oxides, e.g. polyethylene oxide and polypropylene oxide, in addition to being conveniently water-soluble and having suitable melting temperatures (e.g. polyethylene oxide melts below 75° C.) have the advantage that they serve as both pore-forming and processing agents for fibrillatable polymers such as polytetrafluoroethylene and polypropylene. In general, such pore-formers have molecular weights in the neighborhood of 100,000 to 1,000,000.

The amount of pore-former to be incorporated in the precursor catalyst composition is dependent on the amount of porosity desired in the ultimate product. In general, the pore-former is present in the precursor catalyst material in a major amount, i.e. at least about 10% by weight, typically about 15% to about 50%, and preferably over 25 or 30 weight %. In a catalyst system, for example, it is desirable to have maximum exposure of the active material and to have free movement of the reacting medium throughout the mass. To achieve this, the porous, polymeric active composition, preferably, has about 70 to 80 volume % porosity, and the pores should be interconnecting. For such porosity, an equivalent volume % of leachable pore-former is needed in the precursor electrode composition, e.g. about 70 to 80 volume %. This is equivalent to about 15 to 50 weight % of polyethylene oxide. To obtain porosity of this extent and type using a fugitive gaseous pore-former considerably more pore-former would be necessary, and this could be estimated based on the volume of gas produced and conditions.

The catalyst material, which is the predominant component of the catalyst system, is determined by the ultimate use of the material. The catalyst material can be active or activatable even after incorporation in the catalyst system under suitable conditions well known in the catalyst art. As used herein the term active catalyst material includes activatable catalyst material.

Catalytically active materials are well known to those skilled in many different chemical processing disciplines. The number of naturally occurring and synthesized catalysts is vast. They can be simple or complex, inorganic or organic, metallic or non-metallic. It is known to use promoters and poisons for the active materials, and the catalysts may be used unsupported or supported on carriers. The carriers (e.g. silica, alumina, magnesia, etc.) may be essentially inert or may affect the reaction or reactivity of the catalysts. No attempt is made here to define this very complex subject. The present invention is not restricted to any catalyst or group of catalysts. The catalytically active material may consist substantially of the catalytic material per se or it may be comprised of active material and other components which are related to the active material or its function in the polymeric composition. For example, the catalyst material may include promoters or poisons. It may be unsupported or deposited on a carrier. The active material may also include components or components in special form which will enhance the thermal or electrical properties of the composition. By way of example, it is well known to use platinum group metals, nickel, cobalt, molybdenum, rhenium, silver, copper, in elemental form or as alloys or compounds or other combinations in hydrogenation, hydration, oxidation dehydrogenation, isomerization and petroleum reforming reactions. Catalysts are used, for example, to effect known reactions under more favorable conditions and/or with greater selectivity. In general, whether supported or unsupported on a carrier, the catalyst material is used in particulate, and advantageously, in finely divided form. Particulate catalysts are well known and useful in many types of fixed or fluid or fluidized bed reactors. Often there is a problem of pyrophoricity with active elemental catalysts in a finely divided state. The present invention affords the possibility of using active particulate catalysts in a convenient and/or less dangerous form. The selection of active materials and the processes to which they can be applied are limited to the temperature ranges dictated by the thermal and chemical stability of the polymeric material used in the structure of the present invention.

Typically, the tripartite system from which the fibrillated, porous polymer is developed will have the following composition:

| Component Type | Example | Typical parts by weight Range (Ca) |
|---|---|---|
| Support-Contributing Polymer | Low Density Polyethylene | 5 to 10 |
| Fibrillatable Polymer | Teflon 7A | 1 to 5 |
| Leachable Resin | Polyox WSRN-10 | 40 to 60 |

To this mixture may be added, e.g. 142 parts of catalytic materials, e.g. Ni powder or Pt deposited on an $Al_2O_3$ carrier. The relative concentration of polymer: active material will vary, e.g. according to the processing technique and equipment used and the ultimate use of the catalytic material.

In general, the polymeric composition prior to removal of the pore-former is comprised, by weight, of about 50% to 75% active material, about 0.5% to about 5% fibrillated polymer, about 47% to about 10% pore-former, and the balance essentially support-contributing polymer.

To prepare the porous catalyst composition, the initial components (i.e. the active material, the fibrillatable first polymer, the support-contributing polymer and the pore-former) are first converted to the precursor catalyst composition by a method comprising subjecting such components to conditions to convert the fibrillatable polymer by a dry processing technique, e.g. as a powder or tape under shear stresses, to fibrous form and to transform the components to a material composed of discrete fibers throughout an intimate mixture consisting of active material, support-contributing polymer and pore-former. The components can all blended together initially, e.g. in a blender such as a Banbury mixer or a ball mill, and then processed, e.g. in an extruder. Alternatively, the components can be mixed with each other and processed in various sequences depending on the desired ultimate configuration and the equipment used. By removal of the pore-former, the precursor catalyst composition is converted to the catalyst composition.

Typically, the precursor material is prepared by mixing dry powders of the support-contributing polymer, the fibrillatable polymer, a removable pore-former, and the active material in a blending vessel until the ingredients are completely blended (typically about 10 to 30 minutes) at an elevated temperature, but below the degradation temperature of any of the components. Initial fibrillation can take place by subjecting the mix to shearing stresses, e.g. in an extruder or a roll-type mill, using sequential additions. During the processing, the fibrillatable polymer is converted to discrete fibers and the components processed are intimately dispersed in the system. Advantageously, the fibrillatable component is processed in-situ to the fibrous component of the precursor polymeric catalyst composition. By fibrillated in-situ is meant that it is fibrillated in the presence of at least one component of the composition, e.g. the active material. By removal of the pore-former the precursor polymeric composition is converted to the porous product. The terms fibrils and fiber-containing refer to the discrete fibers developed in such processing. The extruded material can be granulated, pelletized, made into cylinders, spheres or rings or the like. The ultimate shape is determined by those skilled in the art for the use intended for the active material.

In a system in which polyethylene is the support-contributing polymer, polytetrafluoroethylene is the fibrillatable polymer and a water-soluble resin such as polyethylene oxide is the pore-former, mixing can be carried out as a continuous process simultaneously with fibrillation, e.g. in a two roll mill at 65°-75° C., using the addition sequence: (1) support-contributing polymer, (2) removable resin, (3) fiber-forming resin, (4) active material. As one alternative, batch compounding can be carried out in several sequences, in a mixing vessel such as a Banbury mixer or a twin-screw extruder. For example, pre-fibrillation of the fiber-forming agent such as Teflon 7A and active materials can be carried out in a mixer or ball mill to create maximum fibrillation and dispersion of fibers in the active material. This material is removed from the mixer. The mixer is pre-heated to 75°–100° C. and operated at a controlled mixing speed of 14 RPM. The mixing addition sequence is as follows: First, the polymer and water-soluble resin are added to the mixer and mixed at a temperature of about 75°–100° C., for about 5 to 10 minutes to insure fluxing. Next a pre-blend of active material and fibrillated polymer (such as Teflon 7A) is added. The total composition is mixed for an additional 5–10 minutes. The resultant mixture is removed from the mixer and pressed into thin sheets and then pelletized, ground or otherwise made into particulate form. The material is now ready for extrusion, compression molding, injection molding or calendering. It is noted that the material can be extruded, and compositions of this type have been extruded, for example, through a 1/16 inch die into a continuous rod form. If a water-soluble resin, such as Polyox WSRN-10, is used, then after being extruded as rod (or tubular) form, the extruded form is leached in water at a temperature of 50° C. to remove the water-soluble resin. After drying, the materials are cut to required length, with the active catalyst or other active material now exposed and encradled in a complex of fibrils. The fibril-encradled active material is dispersed through the porous, fiber-containing polymeric composition.

It will be understood by those skilled in the art that the selection of any particular ingredient in a system is a matter of selection depending on ultimate use, availability of materials, cost, etc., and the present invention is not restricted to the particular ingredients disclosed or to the examples. They are merely given as a guide to understanding the present invention.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A particulate catalyst composition comprising a catalyst material encradled throughout a porous, fiber-containing polymeric material, said catalyst composition comprising, by weight, at least 50% to about 75% catalyst material, about 1% to about 5% fibrillated first polymer and the balance a support-contributing second polymer, and having porosity therethrough, said first polymer being a halogenated polyolefin, said composition being developed from a mixture of a catalyst material, a fibrillatable first polymer, a support-contributing second polymer and a major amount of a removable pore-former, said porosity being developed on removal of the pore-former from said mixture.

2. A particulate catalyst composition in accordance with claim 1, characterized in that the pore-former is capable of wetting the catalyst material on being mixed therewith.

3. A particulate catalyst composition in accordance with claim 1, characterized in that the pore-former prior to removal is present in an amount of about 15 to about 50 weight percent.

4. A particulate catalyst composition in accordance with claim 1, characterized in that it is comprised, by weight of at least about 50% catalytically active particles.

5. A particulate catalyst composition according to claim 1, characterized in that the catalyst material comprises a member selected from the group nickel, cobalt, molybdenum, copper, rhenium, silver, and platinum group metals, compounds, and alloys thereof, and mixtures and other combinations thereof.

6. A particulate catalyst composition according to claim 1, characterized in that the support-contributing polymer comprises a thermoplastic polymer and the fibrillatable first polymer comprises polypropylene or a halogenated polyolefin.

7. A particulate catalyst composition according to claim 3, characterized in that the fibrillatable first polymer is polytetrafluoroethylene.

8. A particulate catalyst composition according to claim 1, characterized in that the removable pore-former comprises a polyolefin oxide.

9. A method of preparing a particulate catalyst composition comprised of at least 50% by weight of catalyst material comprising subjecting precursor components comprising a fibrillatable first polymer, a support-contributing second polymer, a catalyst material and a major amount of a removable pore-former to conditions to fibrillate the first polymer, to mix intimately said components and to form a precursor composition containing a major amount of said pore-former, said first polymer being a halogenated polyolefin present in the precursor mixture in an amount of about 0.5 to about 5%, shaping the precursor composition and subsequently removing said pore-former from the shaped precursor composition, thereby producing interconnecting porosity throughout the material, with the active material encradled throughout the porous, fiber-containing material.

10. A method according to claim 9, characterized in that the processing of the components is carried out in standard polymer processing equipment.

11. A method according to claim 9, characterized in that the pore-former comprises a polymer.

12. A method according to claim 9, characterized in that the fibrillatable first polymer is converted to fibrous form by processing in the presence of at least one of the precursor components of the composition.

13. A method according to claim 12, characterized in that the fibrillatable polymer is at least partially converted to fibrillated form in the presence of the active material and the resultant mixture is added to a blend consisting of at least a part of the pore-former and support-contributing polymer.

14. A method according to claim 9, characterized in that the shaping comprises extruding the composition, the pore-former is removed from the extrudate, and then the extrudate is converted to particulate form.

15. A method according to claim 9, characterized in that the removable pore-former is water-soluble and the pore-former is removed from the shaped precursor composition by leaching in water.

16. A method according to claim 9, characterized in that the removable pore-former is a water-soluble polymer having a molecular weight of about 100,000 to 1,000,000.

17. A method according to claim 9, characterized in that the pore-former comprises polyethylene oxide.

18. A method according to claim 9, characterized in that the precursor components are provided as materials for dry processing.

19. A particulate catalyst composition according to claim 1, characterized in that it is comprised, by weight, of about 75% to about 90% catalyst material, about 1% to about 5% fibrillated polymer and the balance essentially a support-contributing polymer.

20. A particulate catalyst composition according to claim 1, characterized in that the removable pore-former is a water-soluble polymer.

21. A particulate catalyst composition according to claim 1, characterized in the the precursor components are provided as materials for dry processing.

* * * * *